United States Patent
Keller

(10) Patent No.: US 6,270,253 B1
(45) Date of Patent: Aug. 7, 2001

(54) METHOD FOR MEASURING THE TEMPERATURE OF HOT GASES BY MEANS OF A THERMOCOUPLE, AND A MEASURING ARRANGEMENT FOR CARRYING OUT THE METHOD

(75) Inventor: Jakob Keller, Wohlen (CH)

(73) Assignee: Asea Brown Boveri AG, Baden (CH)

( * ) Notice: Subject to any disclaimer, the term of this patent is extended or adjusted under 35 U.S.C. 154(b) by 0 days.

(21) Appl. No.: 09/282,194

(22) Filed: Mar. 31, 1999

(30) Foreign Application Priority Data

Apr. 7, 1998 (EP) .............................................. 98 810 293

(51) Int. Cl.[7] ................................................... G01K 13/02
(52) U.S. Cl. .......................... 374/138; 374/144; 374/148; 374/179
(58) Field of Search ..................................... 374/138, 148, 374/179, 125, 144, 147; 73/117.3

(56) References Cited

U.S. PATENT DOCUMENTS

| | | | |
|---|---|---|---|
| 247,157 | * 9/1881 | Brown | 374/148 |
| 247,240 | * 9/1881 | Brown | 374/148 |
| 2,525,361 | * 10/1950 | Lamb | 374/138 |
| 3,167,960 | * 2/1965 | Miesiak | 374/138 |
| 3,451,268 | 6/1969 | Meador | 374/144 |
| 3,597,920 | * 8/1971 | Wadman | 374/144 |
| 4,423,967 | * 1/1984 | Mouton | 374/138 |
| 4,480,930 | * 11/1984 | DeZubay et al. | 374/144 |
| 5,116,137 | * 5/1992 | Xiong et al. | 374/138 |
| 5,348,395 | * 9/1994 | Corr, II. et al. | 374/138 |
| 5,397,181 | 3/1995 | McNulty | 374/144 |
| 5,941,927 | * 8/1999 | Pfitz | 374/144 |

FOREIGN PATENT DOCUMENTS 2 100 003A    12/1982  (GB) .

* cited by examiner

Primary Examiner—Diego Gutierrez
Assistant Examiner—Stanley J. Pruchnic, Jr.
(74) Attorney, Agent, or Firm—Burns, Doane, Swecker & Mathis, L.L.P.

(57) ABSTRACT

A method and arrangement for measuring the temperature of hot gases present in a hot gas space. A portion of the hot gases is mixed in a mixing space arranged inside the hot gas space with a cooler gas. The temperature of the gas mixture is measured with a thermocouple which is provided in the mixing space. The gas mixture is guided past the thermocouple to determine the temperature of the hot gases from the measured temperature of the gas mixture. The hot gas space is located in the combustion chamber of a gas turbine.

10 Claims, 3 Drawing Sheets

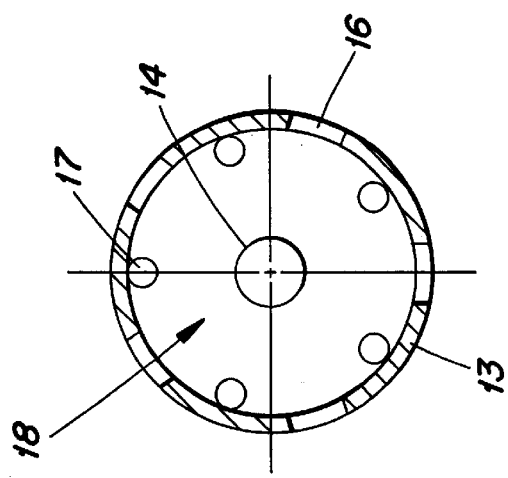
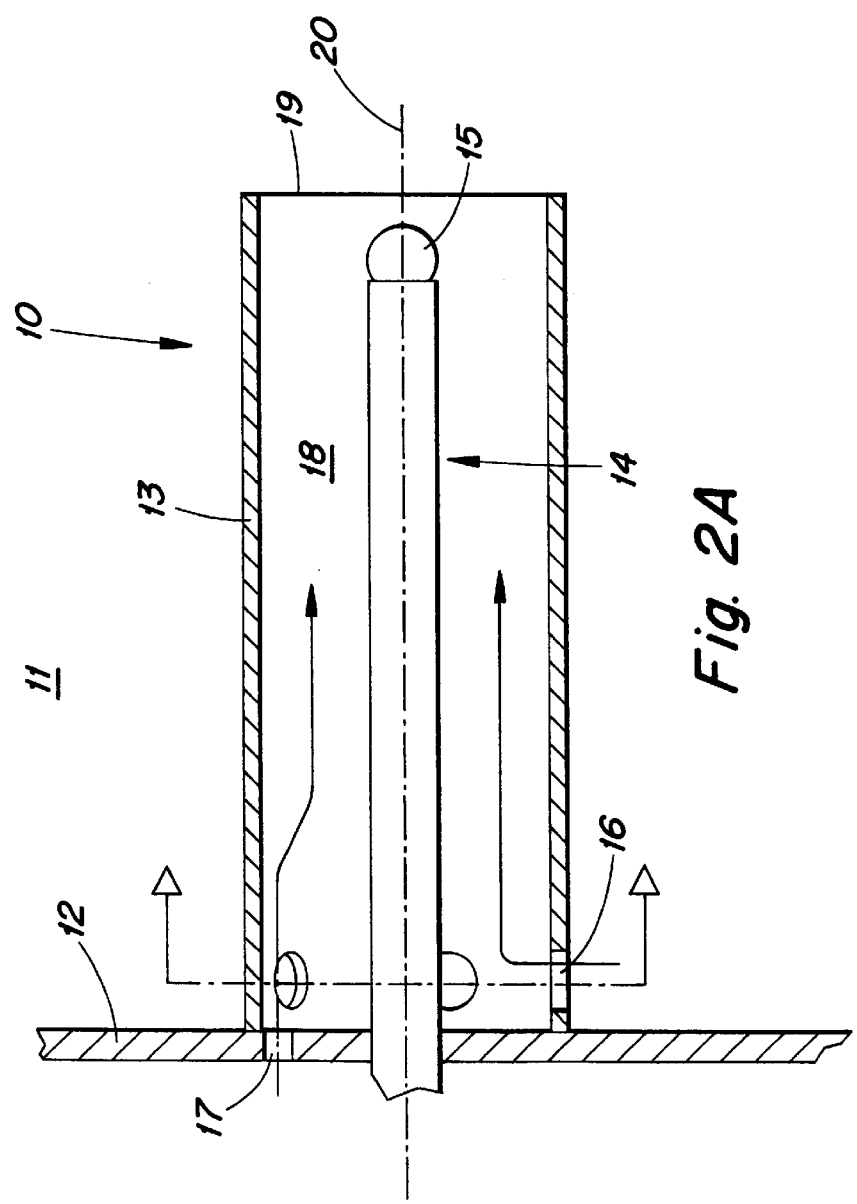

METHOD FOR MEASURING THE TEMPERATURE OF HOT GASES BY MEANS OF A THERMOCOUPLE, AND A MEASURING ARRANGEMENT FOR CARRYING OUT THE METHOD

FIELD OF THE INVENTION

The present invention relates to the field of temperature measurement technology. It relates to a method for measuring the temperature of hot gases present in a hot gas space, in particular in the combustion chamber of gas turbines, by means of a thermocouple. The invention also relates to a measuring arrangement for carrying out such a method.

BACKGROUND OF THE INVENTION

In order to control and monitor the operation of gas turbines, it is necessary to measure and/or to determine in the combustion chambers of the gas turbines the high temperatures occurring there for the hot gases. Because of the high temperatures and the rugged environment at the measurement site, such a temperature measurement confronts the measurement technology with virtually insurmountable difficulties. One possibility of circumventing these difficulties consists in measuring the temperature of the gases at a cooler point of the machine located further downstream and using the measured data to derive temperatures in the combustion chamber on the basis of a machine model. However, it is disadvantageous in this case that there is only a very indirect and time-delayed relationship between the actually measured temperatures and those to be determined.

Another possibility consists in conducting the temperature measurement by using, for example, thermocouples made from special metals such as platinum and platinumrhodium which withstand the hot gas temperatures occurring in the combustion chamber and can thereby be used directly in the combustion chamber for measurement purposes. However, the high costs which occur from using such metals, in particular in the case of the use of several measurement sites, constitute a disadvantage here.

It has therefore already been proposed in GB-A-2 100 003 to make use for temperature measurement in aircraft turbines of combined thermocouple arrangements which operate on two staggered temperature levels and comprise a short high-temperature thermocouple, arranged between the two temperature levels and made from platinum/platinum-rhodium, for the first high temperature level, and a compensation thermocouple, which has a lower load bearing capacity and is made from alumel/chromel, for the second, lower temperature level. The actual temperature of the first temperature level can then be determined computationally from the measured data of the two thermocouples. However, the savings made on wire length for the high-temperature thermocouple are bought at the expense of a complicated design of the measurement probe and by the doubling of the number of measurements.

SUMMARY OF THE INVENTION

Accordingly, one object of the invention is to provide a novel method and a measuring arrangement for measuring high hot gas temperatures such as occur in combustion chambers of gas turbines, which require little outlay, quickly deliver reliable results and are distinguished by simple and cost-effective design.

The object is achieved in the case of a method of the type mentioned in the beginning by virtue of the fact that a portion of the hot gases to be measured is mixed in a defined way with a cooler gas, that the temperature of the gas mixture is measured by means of the thermocouple, and that the temperature of the hot gases to be measured is determined from the measured temperature of the gas mixture. Mixing with a cooler gas produces a gas mixture with a reduced temperature which can be measured without a problem using a thermocouple which is less thermostable. Since the mixing is performed in a defined way, it is possible to calculate the original temperature of the hot gases backward without difficulty starting with the temperature of the gas mixture.

A preferred embodiment of the method according to the invention is defined in that mixing the gases is undertaken in a mixing space arranged inside the hot gas space and delimited therefrom, that the cooler gas from outside the hot gas space is injected at increased pressure into the mixing space, that gases from the hot gas space are added to the injected cooler gas and mixed therewith, and that for the purpose of measuring, the gas mixture produced is guided past the thermocouple arranged in the mixing space, and subsequently let up into the hot gas space. It is thereby possible to carry out the measurement in a very compact arrangement.

The measuring arrangement for carrying out the method is defined in that a mixing space extending transverse to the wall into the hot gas space and adjacent to the wall is separated by separating means inside the hot gas space, which is bounded by a wall, that at least one injection opening is provided through which the cooler gas can be introduced or injected from outside the hot gas space through the wall into the mixing space, that there is provided at the end, facing the wall, of the mixing space in the separating means at least one recirculation opening, through which the hot gas can enter the mixing space from the hot gas space, that at the end, averted from the wall, of the mixing space, the mixing space is connected to the hot gas space via an outlet, and that the thermocouple is arranged in the mixing space in the vicinity of the outlet.

A preferred embodiment of the measuring arrangement according to the invention is distinguished in that the separating means comprise an injection tube which, proceeding from the wall in a fashion concentric with an axis, projects into the hot gas space, that the thermocouple is arranged on the axis, that, distributed uniformly over the circumference of the injection tube, a multiplicity of recirculation openings orientated in the radial direction are arranged in the injection tube, and that, arranged uniformly on a circle, a multiplicity of injection openings orientated in the axial direction are provided in the part of the wall which is situated inside the injection tube. The result is a very good thorough mixing of the hot and cooler gases.

Further embodiments follow from the dependent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 shows the measuring arrangement of FIG. 1 in a longitudinal section (FIG. 2A) and a cross section (FIG. 2B);

DESCRIPTION OF THE PREFERRED EMBODIMENTS

Figure 1:
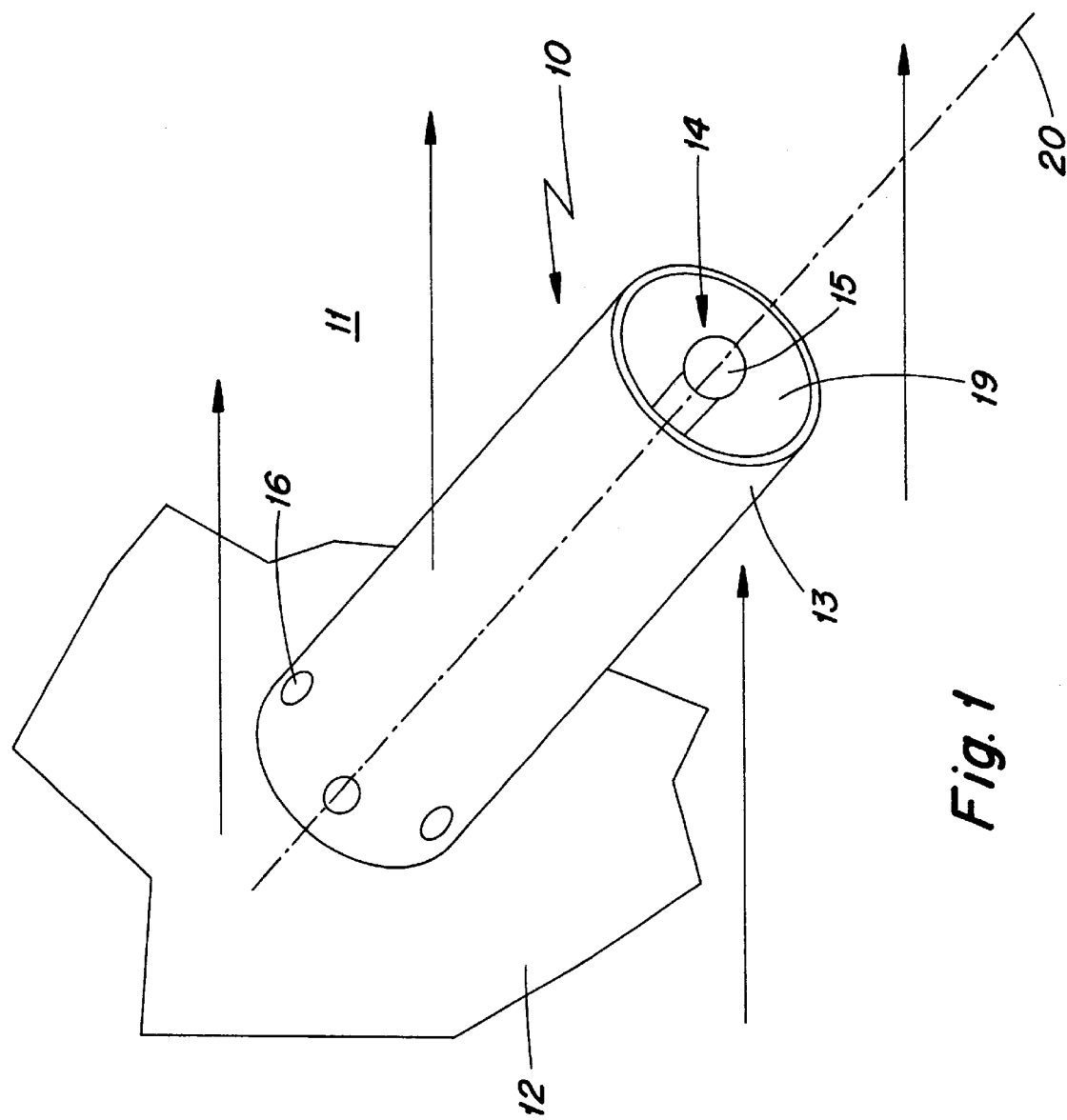
FIG. 1 shows a perspective representation of a preferred exemplary embodiment of a measuring arrangement according to the invention.

Referring now to the drawings, wherein like reference numerals designate identical or corresponding parts throughout the several views, in FIG. 1 a perspective representation of a preferred exemplary embodiment of a measuring arrangement according to the invention is reproduced. The measuring arrangement 10 is located in a hot gas space 11 which is bounded laterally by a wall 12 (the wall 12 and hot gas space 11 are represented only partially). Hot combustion gases whose temperature is to be measured flow through the hot gas space 11 in the direction of the arrows illustrated. An injection tube 13 arranged concentrically with an axis 20 projects, proceding from the wall 12, into the hot gas space 11 in a fashion transverse to the flow direction and to the wall 12 (see also FIG. 2A). The interior of the injection tube 13 forms a mixing space 18 for mixing hot and cooler gases to form a gas mixture with a reduced temperature. The injection tube 13 is open at the end averted from the wall 12 and the opening forms an outlet 19 into the hot gas space 11 for the mixing space 18. The injection tube 13 itself consists of a material stable at high temperatures, for example a ceramic or a suitable metal alloy.

In order to measure the gas mixture forming in the mixing space, there is arranged inside the injection tube 13 and lying on the axis 20 a thermocouple 14 which is led with its feed wires through the wall 12 into the mixing space 18 and comes to lie just in front of the outlet 19 with its temperature-sensitive tip 15. The thermocouple 14 can in this case be surrounded entirely or partly by a protective tube. Provided for the purpose of feeding the cooler gas from outside the hot gas space 11 into the mixing space 18 are a plurality of injection openings 17 (FIGS. 2A, B) which lie inside the injection tube 13 in the wall 12 on a circle and through with the cooler gas is injected into the mixing space 18 at an increased pressure. If the hot gas space 11 is surrounded by a so-called "plenum", as is the case with gas turbines, the compressed combustion air present in the plenum is injected as the cooler gas. Provided not far from the injection openings 17 in the wall of the injection tube 13 are recirculation openings 16 which are distributed over the circumference and through which the hot gas to be measured can flow into the mixing space 18 from the hot gas space 11.

The hot gas is entrained in this case by the injection jets of the cooler gas which emerge from the injection openings 17, and mixes with the cooler gas on the way to the outlet 19. For the purpose of better mixing, it is preferable to have equal numbers of injection openings 17 and recirculation openings 16, which are respectively arranged offset relative to one another (FIG. 2B). The length of the injection tube 13 and the position of the tip 15 of the thermocouple 14 in the injection tube are selected such that the two gases from the openings 16 and 17 are completely mixed on the way to the tip 15 and have formed a uniform temperature of the mixture. The injection arrangement must in this case meet the same requirements as are placed, for example, on exhaust gas return injectors for low-NOx burners in furnaces.

Figure 3:
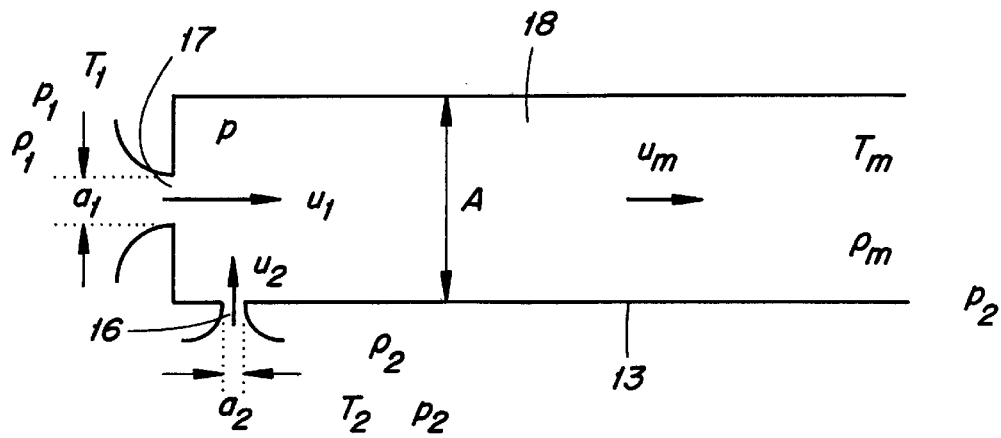
FIG. 3 shows a diagrammatic representation of the measuring arrangement of FIG. 1 for the purpose of deriving the calculation formulas.

The injection arrangement in accordance with FIGS. 1 and 2 is determined by the parameters specified in the diagrammatic representation in accordance with FIG. 3. The aim is to determine the temperature $T_2$ of the hot gas flowing into the mixing space 18 through the lateral recirculation opening 16. In order not to expose the thermocouple to the extremely high temperature of the hot gas, according to the inventive method the hot gas is mixed with a cooler gas (air) of temperature $T_1$, and the (reduced) mixing temperature $T_m$ of the gas mixture is measured. The temperature $T_2$ of the hot gas can then be determined from this measured mixing temperature $T_m$. The properties of the injector arrangement required for this temperature determination are described by the following equations.

The Bernoulli equations $$p_1 = p + \tfrac{1}{2}\rho_1 u^2_1 \tag{1}$$

and $$p_2 = p + \tfrac{1}{2}\rho_2 u^2_2 \tag{2}$$

hold for two inlet openings, specifically the injection opening 17 and the recirculation opening 16, $p_1$ and $p_2$ being the pressures of the (driving) cooler gas and of the (driven) hot gas before entry into the mixing space 18; p being the static pressure at the openings 16 and 17 inside the mixing space 18; $\rho_1$ and $\rho_2$ being the initial densities of the cooler and hot gases, and $u_1$ and $u_2$ being the flow velocities of the cooler and hot gases in the openings 17 and 16. The conservation of the mass flow and volumetric flow lead to $$a_1\rho_1 u_1 + a_2\rho_2 u_2 = A\rho_m u_m \tag{3}$$

and $$a_1 u_1 + a_2 u_2 = A u_m \tag{4}$$

where $\rho_m$ and $u_m$ denote the density and flow velocity of the gas mixture, $a_1$ and $a_2$ are the cross-sectional surfaces of the openings 17 and 16, and A is the cross-sectional surface of the injection tube 13 or mixing space 18. Finally, the conservation of momentum requires that $$pA + \rho_1 u^2_1 a_1 = p_2 A + \rho_m u^2_m A \tag{5}$$

It follows, furthermore, from the equation of state that $$\rho_1 T_1 + \rho_2 T_2 = \rho_m T_m. \tag{6}$$

Figure 4:
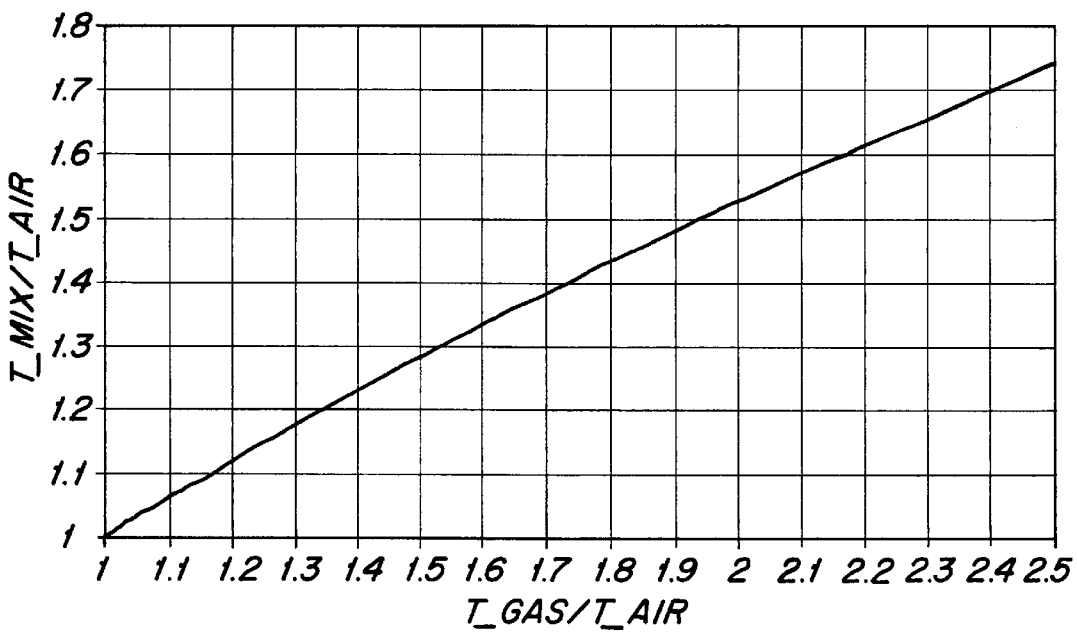
FIG. 4 shows an exemplary diagram for the relationship between the measured temperature of the gas mixture ($T_{MIX}$) and the actual temperature ($T_{GAS}$) of the hot gases to be measured.

Equations (1) to (6) can then be used to determine $T_m/T_1$ as a function of $T_2/T_1$. A corresponding diagram for the values $a_1/A = 0.05$ and $a_2/A = 0.3$ is reproduced in FIG. 4, where it holds that TAIR=$T_1$, TGAS=$T_2$ and that TMIX=$T_m$. If the thermocouple 14 now measures a value $T_m$ for the gas mixture, the corresponding value for TGAS or $T_2$ can be read off for this value from the diagram of FIG. 4. This can be performed, for example, automatically in a computer which either has stored the curve of FIG. 4 in the form of a table or represents the curve by an equation.

An important property of the injection arrangement is that the ratio of the mass flows of the hot and cooler gases does not depend on the throughput as long as the Reynolds numbers are sufficiently large. For this reason, the relationship represented in FIG. 4 between the temperatures does not depend on the throughput. On the other hand, it is, however, important for the pressures at the outlet 19 of the injection tube 13 and at the recirculation openings 16 to be equal. If the measuring arrangement is exposed to high flow velocities, it is therefore necessary to take special screening measures in order to ensure the pressures at the two points of the arrangement are equal.

Overall, the method and the measuring arrangement offer the possibility of carrying out reliable temperature measurement even in the case of very high temperatures with the aid of comparatively simple means and an accuracy which is only slightly reduced. It is even possible to measure inlet temperatures in the case of gas turbines by taking suitable screening measures against high flow velocities.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for measuring the temperature of hot gases present in a hot gas space, comprising the steps of:

mixing a portion of the hot gases to be measured in a defined way and in a mixing space arranged inside the hot gas space and delimited therefrom with a cooler gas from outside the hot gas space to form a gas mixture, said cooler gas being injected into said hot gas space at a higher pressure than the pressure of the gas mixture in the hot gas space;

measuring the temperature of the gas mixture by means of a thermocouple;

guiding the gas mixture past the thermocouple arranged in the mixing space;

determining the temperature of the hot gases to be measured from the measured temperature of the gas mixture; and letting the gas mixture out into the hot gas space.

2. The method as claimed in claim 1, wherein said cooler gas comprises air.

3. The method as claimed in claim 1, wherein said hot gas space is located in the combustion chamber of a gas turbine.

4. A measuring arrangement for measuring the temperature of hot gases present in a hot gas space, comprising:

a wall, said wall bounding said hot gas space;

a mixing space extending transverse and adjacent to the wall and extending into the hot gas space;

said mixing space being separated from said hot gas space by a separating means which is provided inside the hot gas space;

said wall including at least one injection opening through which the cooler gas can be injected into the mixing space through the wall; and an opening provided at an end of the mixing space, averted from and facing the wall, said opening being arranged to allow the hot gas to enter the mixing space, wherein at the end, the mixing space is connected to the hot gas space through an outlet, and wherein a thermocouple is arranged in the mixing space near the outlet.

5. The measuring arrangement as claimed in claim 4, wherein said hot gas space is located in the combustion chamber of a gas turbine.

6. A measuring arrangement for measuring the temperature of hot gases present in a hot gas space, comprising:

a wall, said wall bounding said hot gas space;

a mixing space extending transverse and adjacent to the wall and extending into the hot gas space;

said mixing space being separated from said hot gas space by a separating means which is provided inside the hot gas space;

said separating means including at least one injection opening through which the cooler gas can be introduced or injected into the mixing space through the wall;

an opening provided at an end of the mixing space, averted from and facing the wall, said opening being arranged to allow the hot gas to enter the mixing space from the hot gas space, wherein at the end, the mixing space is connected to the hot gas space through an outlet, and wherein a thermocouple is arranged in the mixing space near the outlet;

wherein the separating means comprises an injection tube extending from the wall into the hot gas space along an axis generally perpendicular to the wall;

the thermocouple being arranged generally parallel to the axis;

a plurality of recirculation openings being distributed uniformly over the circumference of the injection tube;

said recirculation openings being orientated in the radial direction of the injection tube; and said injection openings being arranged uniformly in a circular pattern and orientated in the axial direction of the injection tube and situated inside the injection tube.

7. The measuring arrangement as claimed in claim 6, wherein the recirculation and injection openings comprise circular holes.

8. The measuring arrangement as claimed in claim 6, wherein an equal number of recirculation openings and injection openings are provided, and wherein the recirculation openings and injection openings are arranged offset relative to one another.

9. The measuring arrangement as claimed in claim 6, wherein the opening of the injection tube averted from the wall forms the outlet.

10. The measuring arrangement as claimed in claim 6, wherein said hot gas space is located in the combustion chamber of a gas turbine.

* * * * *